United States Patent
Niu et al.

(10) Patent No.: US 7,952,593 B2
(45) Date of Patent: May 31, 2011

(54) METHOD AND APPARATUS OF IMAGE MORPHING BY EDGES MAPPING AND COMPUTER ACCESSIBLE STORAGE MEDIUM THEREOF

(75) Inventors: Zong-biao Niu, Shanghai (CN); Li-jun Liao, Shanghai (CN)

(73) Assignee: VIA Technologies, Inc., Taipei Hsien (TW)

( * ) Notice: Subject to any disclaimer, the term of this patent is extended or adjusted under 35 U.S.C. 154(b) by 880 days.

(21) Appl. No.: 11/861,841

(22) Filed: Sep. 26, 2007

(65) Prior Publication Data

US 2008/0266325 A1    Oct. 30, 2008

(30) Foreign Application Priority Data

Apr. 29, 2007 (CN) .......................... 2007 1 0102155

(51) Int. Cl.
*G09G 5/00* (2006.01)

(52) U.S. Cl. ........ 345/629; 345/589; 345/592; 345/419; 345/420; 345/427; 473/474; 382/103; 382/154; 382/276; 382/294; 382/295; 382/296; 382/297; 382/298

(58) Field of Classification Search .................. 345/629, 345/589, 592, 419–420, 427, 473; 382/154, 382/103, 276, 294–298
See application file for complete search history.

(56) References Cited

U.S. PATENT DOCUMENTS

| | | | | |
|---|---|---|---|---|
| 5,917,937 | A * | 6/1999 | Szeliski et al. | 382/154 |
| 6,320,978 | B1 * | 11/2001 | Szeliski et al. | 382/154 |
| 6,526,156 | B1 * | 2/2003 | Black et al. | 382/103 |
| 2008/0219587 | A1 * | 9/2008 | Avidan et al. | 382/276 |

OTHER PUBLICATIONS

Jiaya Jia et al., "Eliminating Structure and Intensity Misalignment in Image Stitching,", Proc. Int'l Conf. Computer Vision, vol. II, pp. 1651-1658, 2005.*
Anat Levin, et. al., "Seamless image stitching in the gradient domain", in ECCV04, May 2004.*
J. Jia and C.-K Tang, "Image Registration with Global and Local Luminance Alignment", Proc. Int'l Conf. Computer Vision, vol. I, pp. 156-163, 2003.*
J. Jia and C.K. Tang, "Tensor Voting for Image Correction by Global and Local Intensity Alignment", IEEE Trans. Pattern Analysis and Machine Intelligence, vol. 27, No. 1, pp. 36-50, Jan. 2005.*
Wei-Ting Chiang, "Interactive Facial Expression System" Thesis of Master Degree of National Taiwan University of Science and Technology, Jul. 6, 2006, Director Professor Chuan-Kai Yang.
Chinese Examination Report of Taiwan Application No. 096122302, dated Jan. 11, 2011.

* cited by examiner

*Primary Examiner* — Jin-Cheng Wang
(74) *Attorney, Agent, or Firm* — J.C. Patents (57) ABSTRACT

An image morphing method is suitable for generating an intermediate image sequence. First, a control point CP=$\{(p_i, q_i)\}_{i=1...N}$ is specified and marked in a source image $I_s(\vec{x})$ and a destination image $I_d(\vec{x}')$. Next, an edge gradient parameter ($I_{se}(\vec{x})$, $I_{de}(\vec{x}')$) is computed according to the source image $I_s(\vec{x})$ and the destination image $I_d(\vec{x}')$. Next, a total objective function $E(D^f, D^b)$ is computed according to the above-mentioned control point CP and edge gradient parameter ($I_{se}(\vec{x})$, $I_{de}(\vec{x}')$). The above-mentioned intermediate image sequence is generated by using the total objective function $E(D^f, D^b)$. The present invention utilizes the edge gradients of the source image $I_s(\vec{x})$ and the destination image $I_d(\vec{x}')$ to enhance the constraint of image morphing. Thus, the image morphing effect is promoted.

18 Claims, 6 Drawing Sheets

SOURCE IMAGE(a)

DESTINATION IMAGE(b)

INTERMEDIATE IMAGE SEQUENCE WITHOUT CONSIDERING EDGE CONSTRAINT

INTERMEDIATE IMAGE SEQUENCE CONSIDERING EDGE CONSTRAINT

METHOD AND APPARATUS OF IMAGE MORPHING BY EDGES MAPPING AND COMPUTER ACCESSIBLE STORAGE MEDIUM THEREOF

CROSS-REFERENCE TO RELATED APPLICATION

This application claims the priority benefit of P.R.C. application serial no. 200710102155.6, filed on Apr. 29, 2007. All disclosure of the P.R.C. application is incorporated herein by reference.

BACKGROUND OF THE INVENTION

1. Field of the Invention

The present invention generally relates to a method for processing multimedia, and more particularly, to an image processing method.

2. Description of Related Art

Image morphing technique is a technique regarding dynamically morphing an image gradually into another image by cross-fading and warping. The technique is broadly applicable to multimedia fields, such as animated cartoon, computer-generated animation technique and processing for special movie effects.

The image morphing technique today is mainly implemented by an operator, who manually defines and marks some control points on a source image and a destination image so as to constrain the geometric deformations of other points by means of the control points, and conducts geometric interpolations to obtain an intermediate image sequence from the source image to the destination image.

The conventional image morphing method is implemented only by an operator to manually define and mark some control points on a source image and a destination image for calculating geometric mapping between images, wherein if the defined control points are too dense, the job burden for an operator to manually mark would be largely increased, in addition to more faults during operating. If the control points are too few however, serious geometric distortions would likely occur at those pixel points far away from a control point in the image.

SUMMARY OF THE INVENTION

Accordingly, the present invention is directed to an image morphing method and an image morphing apparatus suitable for generating an intermediate image sequence to promote the dynamic morphing effect used in multimedia fields.

The present invention provides an image morphing method suitable for generating an intermediate image sequence. First, a set of control points (morph points, or markers) $CP=\{(p_i, q_i)\}_{i=1...N}$ is marked respectively in a source image $I_s(\vec{x})$ and a destination image $I_d(\vec{x}')$. Next, an edge gradient parameter $(I_{se}(\vec{x}), I_{de}(\vec{x}'))$ is computed according to the source image $I_s(\vec{x})$ and the destination image $I_d(\vec{x}')$. Then, a total objective function $E(D^f, D^b)$ is computed according to the above-mentioned control points CP and the above-mentioned edge gradient parameter $(I_{se}(\vec{x}), I_{de}(\vec{x}'))$. Further, the above-mentioned intermediate image sequence $I_t(\vec{x})=\alpha_t I_{si}(\vec{x})+(1-\alpha_t)I_{dj}(\vec{x})$ is generated by using the above-mentioned total objective function $E(D^f, D^b)$.

The present invention also provides an image morphing method suitable for generating an intermediate image sequence. First, an edge gradient parameter $(I_{se}(\vec{x}), I_{de}(\vec{x}'))$ is computed according to a source image $I_s(\vec{x})$ and a destination image $I_d(\vec{x}')$. Then, a total objective function $E(D^f, D^b)$ is computed according to the edge gradient parameter $(I_{se}(\vec{x}), I_{de}(\vec{x}'))$. Further, the above-mentioned intermediate image sequence $I_t(\vec{x})=\alpha_t I_{si}(\vec{x})+(1-\alpha_t)I_{dj}(\vec{x})$ is generated by using the above-mentioned total objective function $E(D^f, D^b)$.

The present invention also provides an apparatus of generating intermediate image sequence to morph images. The apparatus receives a source image and a destination image, and includes a unit of specifying and marking control points, a unit of computing edge gradient parameter, a unit of computing total objective function and a unit of generating intermediate image sequence. The unit of specifying and marking control points respectively in the source image and the destination image specifies and marks at least a control point. The unit of computing edge gradient parameter computes an edge gradient parameter according to the source image and the destination image. The unit of computing total objective function computes a total objective function according to at least one of the control points and the edge gradient parameter. The unit of generating intermediate image sequence generates the intermediate image sequence according to the total objective function.

The present invention also provides an apparatus of generating intermediate image sequence to morph images. The apparatus receives a source image and a destination image, and includes a unit of computing edge gradient parameter, a unit of computing total objective function and a unit of generating intermediate image sequence. The unit of computing edge gradient parameter computes an edge gradient parameter according to the source image and the destination image. The unit of computing total objective function computes a total objective function according to the edge gradient parameter. The unit of generating intermediate image sequence generates the intermediate image sequence according to the total objective function.

According to the embodiments of the present invention, the above-mentioned image morphing method utilizes the edge gradients of the source image $I_s(\vec{x})$ and the destination image $I_d(\vec{x}')$ to enhance image morphing constraint to advance the image morphing effect.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Among all elements of an image, the edges of the image carry over 80% of the total information. When an image is morphed into another image, the most important is how many edge line segments can be smoothly morphed into the corresponding edges in another morphed image, which nearly determines the effectiveness of the used algorithm and the performance of the finally generated intermediate image sequence. Therefore, a mapping between edges in a source image and the corresponding edges in a destination image often serves as an important constraint for modifying a morphing algorithm, which would largely promote the robustness of the above-mentioned algorithm and the performance of an intermediate image sequence.

Accordingly, the present invention induces a concept of edge constraint into the conventional image morphing method, where the correspondences between the edge points in a source image and the corresponding destination image are fully regarded for computing the geometric mappings between the source image $I_s(\vec{x})$ and the destination imaged $I_d(\vec{x}')$. That is to say, the pixels on an edge of the source image $I_s(\vec{x})$ should correspond to the pixels of the corresponding edge of the destination image $I_d(\vec{x}')$ to the fullest extent.

Figure 1:
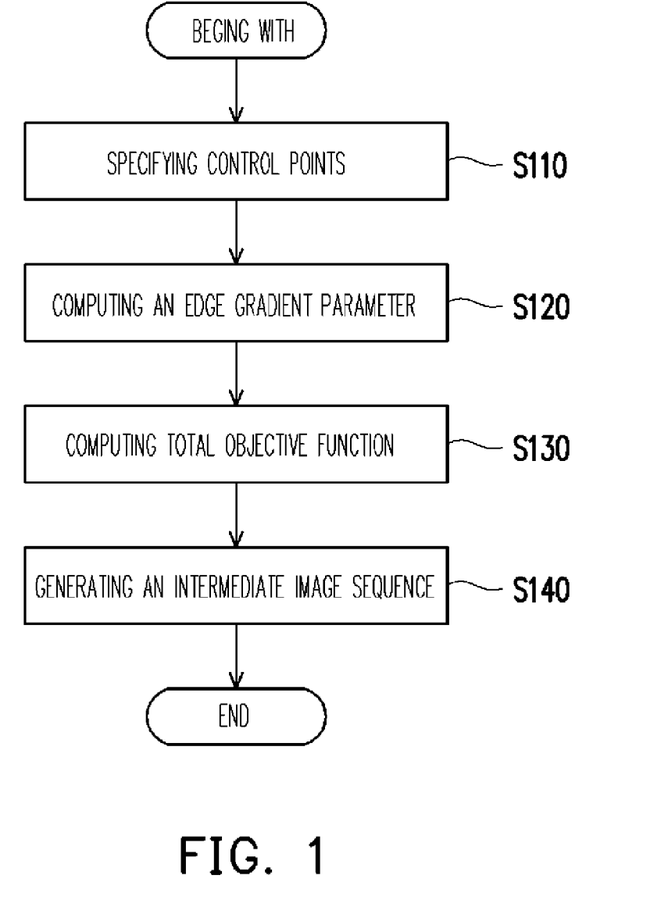
FIG. 1 is a flowchart showing the steps of image morphing method according to an embodiment of the present invention.

FIG. 1 is a flowchart showing the steps of image morphing method according to an embodiment of the present invention. Referring to FIG. 1, first as shown by step S110, a set of control points $CP=\{(p_i,q_i)\}_{i=1\ldots N}$ is specified and marked. Next in step S120, edge gradient parameters $(I_{se}(\vec{x}), I_{de}(\vec{x}'))$ is computed according to the source image $I_s(\vec{x})$ and the destination image $I_d(\vec{x}')$. Then in step S130, a total objective function $E(D^f,D^b)$ is computed by using the control points CP, the source image edge gradient $I_{se}(\vec{x})$ and the destination image edge gradient $I_{de}(\vec{x}')$. Further in step S140, an intermediate image sequence is generated by using the total objective function $E(D^f,D^b)$.

Figure 2:
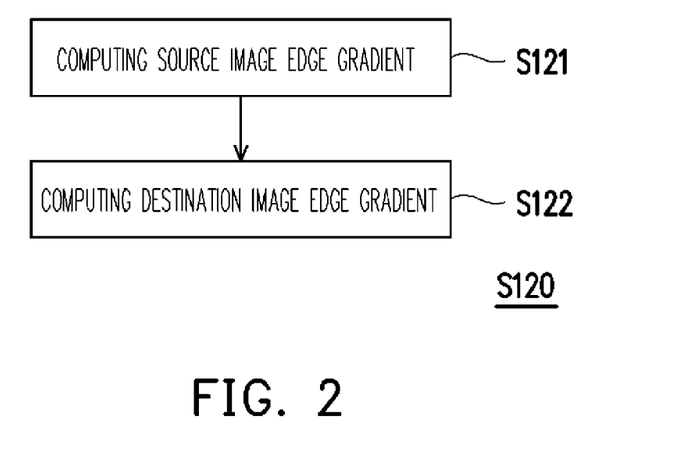
FIG. 2 is a flowchart showing the step of computing an edge gradient parameter according to an embodiment of the present invention.

Referring to FIG. 2, the above-mentioned step S120 in an embodiment of the present invention includes computing the edge gradient of the source image $I_s(\vec{x})$ to obtain a source image edge gradient $I_{se}(\vec{x})$, (step S121) and computing the edge gradient of the destination image $I_d(\vec{x}')$ to obtain a destination image edge gradient $I_{de}(\vec{x}')$, (step S122) wherein the source image edge gradient can be expressed in $I_{se}(\vec{x})=\nabla_{\vec{x}}(I_s(\vec{x}))$, while the destination image edge gradient can be expressed in $I_{de}(\vec{x}')=\nabla_{\vec{x}}(I_d(\vec{x}'))$.

Figure 3:
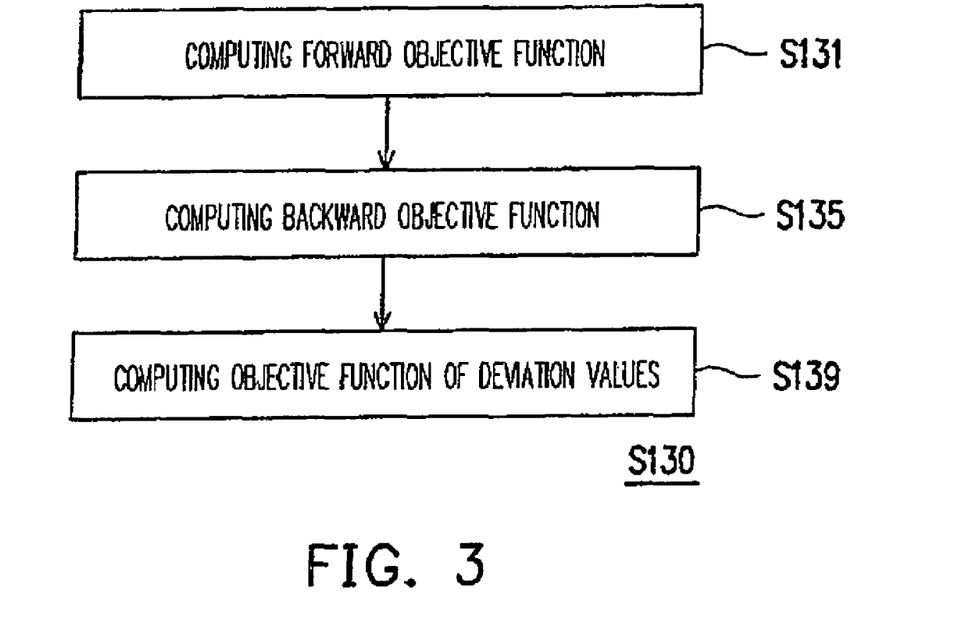
FIG. 3 is a flowchart showing the step of computing a total objective function according to an embodiment of the present invention.

Referring to FIG. 3, the above-mentioned step S130 in an embodiment of the present invention includes computing the total objective function by $E(D^f,D^b)=E^f(D^f)+E^b(D^b)+Dis(D^b,D^f)$, wherein the total objective function $E(D^f,D^b)$ includes a forward objective function $E^f(D^f)$ (step S131), a backward objective function $D^b(\vec{x}')$ (step S135) and an objective function of deviation values $Dis(D^b,D^f)$ (step S139), wherein the forward objective function $E^f(D^f)$ has physical meaning as follows:

Assuming a geometric morphing function from the source image $I_s(\vec{x})$ to the destination image $I_d(\vec{x}')$ is $D^f(\vec{x})$, and $D^f(\vec{x})$ is termed as a forward morphing function which represents a mapping from every point in the source image $I_s(\vec{x})$ to the destination image $I_d(\vec{x}')$ and is expressed by $D^f(\vec{x})=\{d^f(\vec{x})|d^f(\vec{x})=(u,v)\}$. The objective of the forward morphing is a function of the forward morphing function $D^f(\vec{x})$, i.e. forward objective function $E^f(D^f)$.

Similarly, the backward objective function $D^b(\vec{x}')$ has physical meaning as follows:

Assuming a geometric morphing function from the destination image $I_d(\vec{x}')$ to the source image $I_s(\vec{x})$ is $D^b(\vec{x}')$, and $D^b(\vec{x}')$ is termed as a backward morphing function which represents a mapping from every point in the destination image $I_d(\vec{x}')$ to the source image $I_s(\vec{x})$ and is expressed by $D^b(\vec{x})=\{d^b(\vec{x})|d^b(\vec{x})=(u',v')\}$. The objective of the backward morphing is a function of the backward morphing function $D^b(\vec{x}')$,i.e. backward objective function $E^b(D^b)$.

The objective function of deviation values $Dis(D^b,D^f)$ is the distance of the backward morphing function $D^b(\vec{x}')$ from the forward morphing function $D^f(\vec{x})$, which reflects a deviation between the forward geometric morphing and the backward geometric morphing and is defined by:

$$Dis(D^b,D^f) = \sum_{\vec{x}'} \rho_{dis}(d^b(\vec{x}') - d^f(\vec{x}' + d^b(\vec{x}'))) + \sum_{\vec{x}} \rho_{dis}(d^f(\vec{x}) - d^b(\vec{x} + d^f(\vec{x}))),$$

wherein $\rho_{dis}(\vec{x}_1,\vec{x}_2)=\min(\lambda_{dis}\|\vec{x}_1-\vec{x}_2\|,T_{dis})$.

Figure 4:
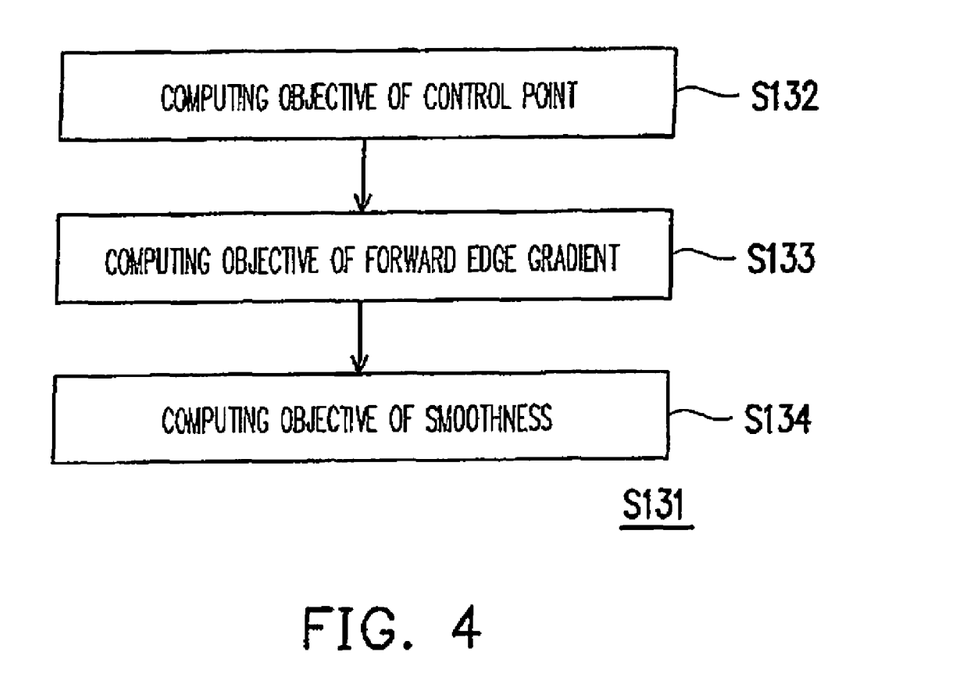
FIG. 4 is a flowchart showing the step of computing a forward objective function according to an embodiment of the present invention.

Referring to FIG. 4, in an embodiment of the present invention, forward objective function $E^f(D^f)$ includes an objective of control point $E_{cp}(D)$ (step S132), an objective of forward edge gradient $E_{edge}^f$ (step S133) and an objective of smoothness $E_s(D)$ (step S134).

The algorithm of the objective of control point $E_{cp}(D)$ is as follows:

Assuming N pairs of control points in the source image $I_s(\vec{x})$ and the destination image $I_d(\vec{x}')$ are $CP=\{(p_i,q_i)\}_{i=1\ldots N}$ and defining $$\vec{t}(\vec{x}) = \begin{cases} (\vec{q}_k - \vec{p}_k) & \text{if } \vec{x} = \vec{p}_k \\ \sum_{i=1}^{N} w_i(\vec{x})(\vec{q}_i - \vec{p}_i) & \text{else} \end{cases}$$

$$w_i(\vec{x}) = 1/\|\vec{x} - \vec{p}_i\| \sum_{i=1}^{N} \frac{1}{\|\vec{x} - \vec{p}_i\|}$$

wherein $\vec{t}(\vec{x})$ represents the displacement vector of each point in source image $I_s(\vec{x})$ or destination image $I_d(\vec{x}')$ when taking account of a control point CP only; then $w_i(\vec{x})$ represents an influence factor of a control point CP on regular image points. The objective of control point $E_{cp}(D)$ is defined by $$E_{cp}(D) = \sum_{\vec{x}} \rho_{cp}(\vec{d}(\vec{x}), \vec{t}(\vec{x})),$$

wherein $\rho_{cp}(\vec{a}, \vec{b}) = \min(\lambda_{cp}\|\vec{a} - \vec{b}\|, T_{cp})$ and $\rho_{cp}$ is an amplitude-limited distance function.

The algorithm of the objective of forward edge gradient $E_{edge}^f$ is as follows:

The objective of forward edge gradient $E_{edge}^f$ is defined by $$E_{edge}^f(D^f) = \sum_{\vec{x}} \rho_{edge}\left(I_{se}(\vec{x}) - I_{de}\left(\vec{x} + \vec{d}^f(\vec{x})\right)\right),$$

wherein $\rho_{edge}(s) = \min(\lambda_{edge}|s|, T_{edge})$ and $\rho_{edge}$ is an amplitude-limited function.

The algorithm of the objective of smoothness $E_s(D)$ is as follows:

Assuming each point in the image is s, which has a 3×3 neighbouring domain N(s) and defining C={s,t|s<t,t∈N(s)} representing the pair number of adjacent points to s in the neighbouring domain, then the objective of smoothness $E_s(D)$ is defined by $$E_s(D) = \sum_{s,t \in C} \lambda_s \|(s + d(s)) - (t + d(t))\|,$$

wherein $\lambda_s$ is the weight of the objective of smoothness $E_s(D)$. Note that the present invention does not limit the neighbouring domain N(s) of a point s to only 3×3, in fact, N(s) can be a m×m neighbouring domain where m is a positive integer greater than or equal to 3, which is still within the scope of the present invention. Moreover, the present invention can cover other non-square neighbouring domains where a smooth computation over the neighbouring domains of each point in the image is performed, and thus non-square neighbouring domains are within the scope of the present invention.

Figure 5:
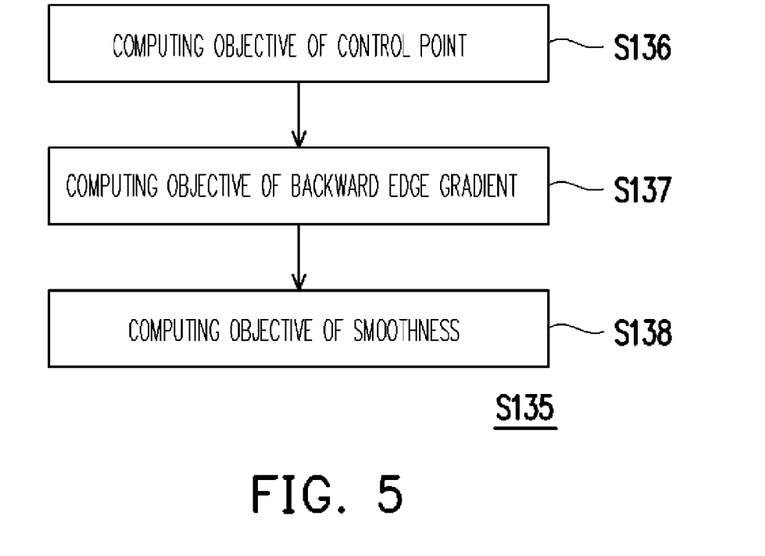
FIG. 5 is a flowchart showing the step of computing a backward objective function according to an embodiment of the present invention.

Similarly as shown by FIG. 5, in an embodiment of the present invention, backward objective function $E^b(D^b)$ includes an objective of control point $E_{cp}(D)$ (step S136), an objective of backward edge gradient $E_{edge}^b$ (step S137) and an objective of smoothness $E_s(D)$ (step S138), wherein the objective of backward edge gradient $E_{edge}^b$ is computed by $$E_{edge}^b(D^b) = \sum_{\vec{x}} \rho_{edge}\left(I_{de}(\vec{x}) - I_{se}\left(\vec{x} + \vec{d}^b(\vec{x})\right)\right)$$

and $\rho_{edge}(s) = \min(\lambda_{edge}|s|, T_{edge})$. The above-mentioned objective of forward edge gradient $E_{edge}^f$ and the objective of backward edge gradient $E_{edge}^f$ reflects that the edge points in the source image $I_s(\vec{x})$ (the image where the morphing begins with) should correspond to the edge points in the destination image $I_d(\vec{x}')$ (the image where the morphing is ended) to the fullest extent so as to ensure a good visual quality of an intermediate image sequence generated by morphing. In terms of the algorithm, an edge objective means the minimum of sums of all gradient differences between each pair of corresponding pixel points in a specific geometric transformation, and the edge objective is a novel concept provided by the present invention.

Figure 6:
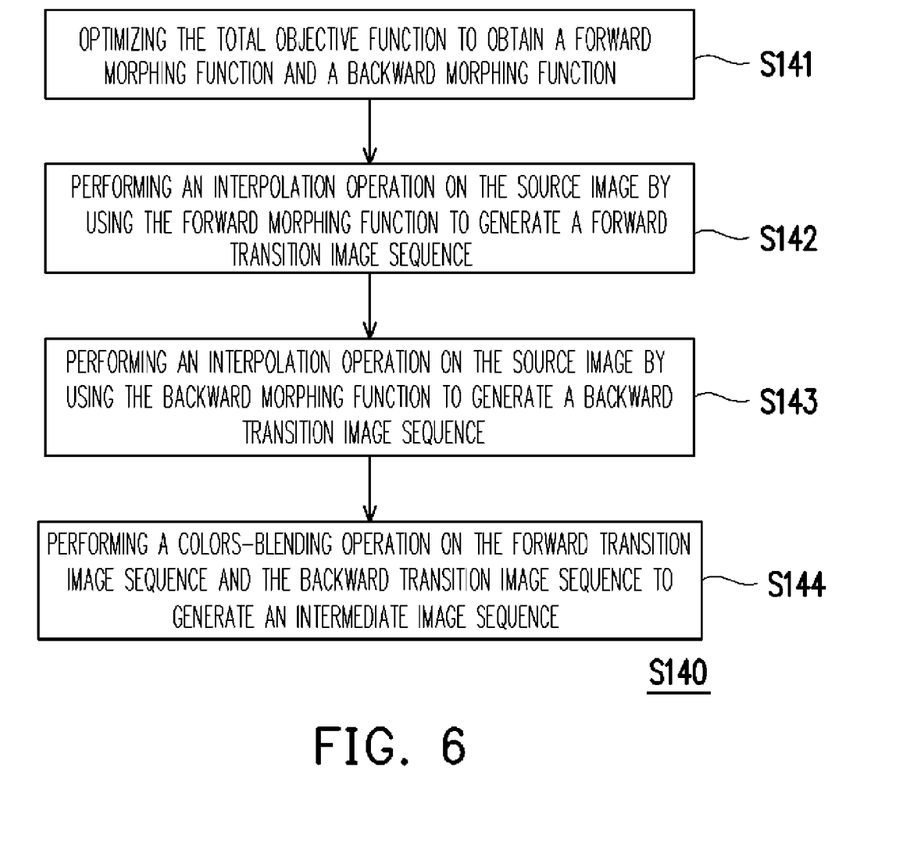
FIG. 6 is a flowchart showing the step of generating an intermediate image sequence according to an embodiment of the present invention.

After obtaining the total objective function $E(D^f, D^b)$, in step S140, a computation is conducted on the total objective function $E(D^f, D^b)$ to obtain the intermediate image sequence. Referring to FIG. 6, first in step S141, the total objective function $E(D^f, D^b)$ is optimized to obtain a specific forward morphing function $\hat{D}^f$ and a specific backward morphing function $\hat{D}^b$. In fact, the specific forward morphing function $\hat{D}^f$ and the specific backward morphing function $\hat{D}^b$ are respectively the forward morphing function $D^f(\vec{x})$ and the backward morphing function $D^b(\vec{x})$ in relation to the total objective function $E(D^f, D^b)$. There are many approaches for optimizing the total objective function $E(D^f, D^b)$, for example, belief propagation algorithm, annealing algorithms and genetic algorithm.

After obtaining the specific forward morphing function $\hat{D}^f$ and the specific backward morphing function $\hat{D}^b$, further, by using the obtained $\hat{D}^f$ to conduct an interpolation operation on the source image $I_s(\vec{x})$ a forward transition image sequence $I_{si}(\vec{x})$ is generated (step S142); by using the $\hat{D}^b$ to conduct an interpolation operation on the destination image $I_d(\vec{x}')$, a backward transition image sequence $I_d(\vec{x}')$ is generated (step S143). Furthermore, the forward transition image sequence $I_{si}(\vec{x})$ and the backward transition image sequence $I_{di}(\vec{x}')$ are used to conduct a color-blending operation so as to generate the intermediate image sequence, which is implemented as follows:

The intermediate image sequence can be $I_i(\vec{x}) = \alpha_i I_{si}(\vec{x}) + (1 - \alpha_i) I_{dj}(\vec{x})$, (i=1, 2 ... N), wherein $\alpha_i = 1 - i/N$, which represents a weight factor of color-blending.

Note that if the source image $I_s(\vec{x})$ is quite similar to the destination image $I_d(\vec{x}')$, the intermediate image sequence may include an image only, which is also construed to be within the scope of the present invention.

The objective of control point $E_{cp}(D)$ represents the constraint of the specified and marked control point on a geometric transformation function. The objective of forward edge gradient $E_{edge}^f$ and the objective of backward edge gradient $E_{edge}^b$ are used to measure the mapping extent of the edge information between the source image $I_s(\vec{x})$ and the destination image $I_d(\vec{x}')$ in the geometric transformation. The objective of smoothness $E_s(D)$ represents whether the geometric transformation in the space is smooth.

The objective of forward edge gradient $E_{edge}^f$ and the objective of backward edge gradient $E_{edge}^b$ are the novel ideas provided by the present invention. Taking FIG. 7 as an example, when the structures of the source image (a) and the destination image (b) are simpler, the control points specified and marked control points in the source image (a) and the destination image (b) are usually located at four corners of the square. However, from the point of view of the objective of forward edge gradient $E_{edge}^f$ and the objective of backward edge gradient $E_{edge}^b$, the color differences between the square of the source image (a) and the circle of the destination image (b) are significant, i.e., the square of the source image (a) and the circle of the destination image (b) have great gradients at the edges thereof, therefore, the physical meaning to consider the objective of forward edge gradient edge and the objective of backward edge gradient edge rest in that an indefinitely large number of control points are specified and marked on the edges of the source image (a) and the destination image (b) instead of four corners of the square of the source image (a).

Figure 7:
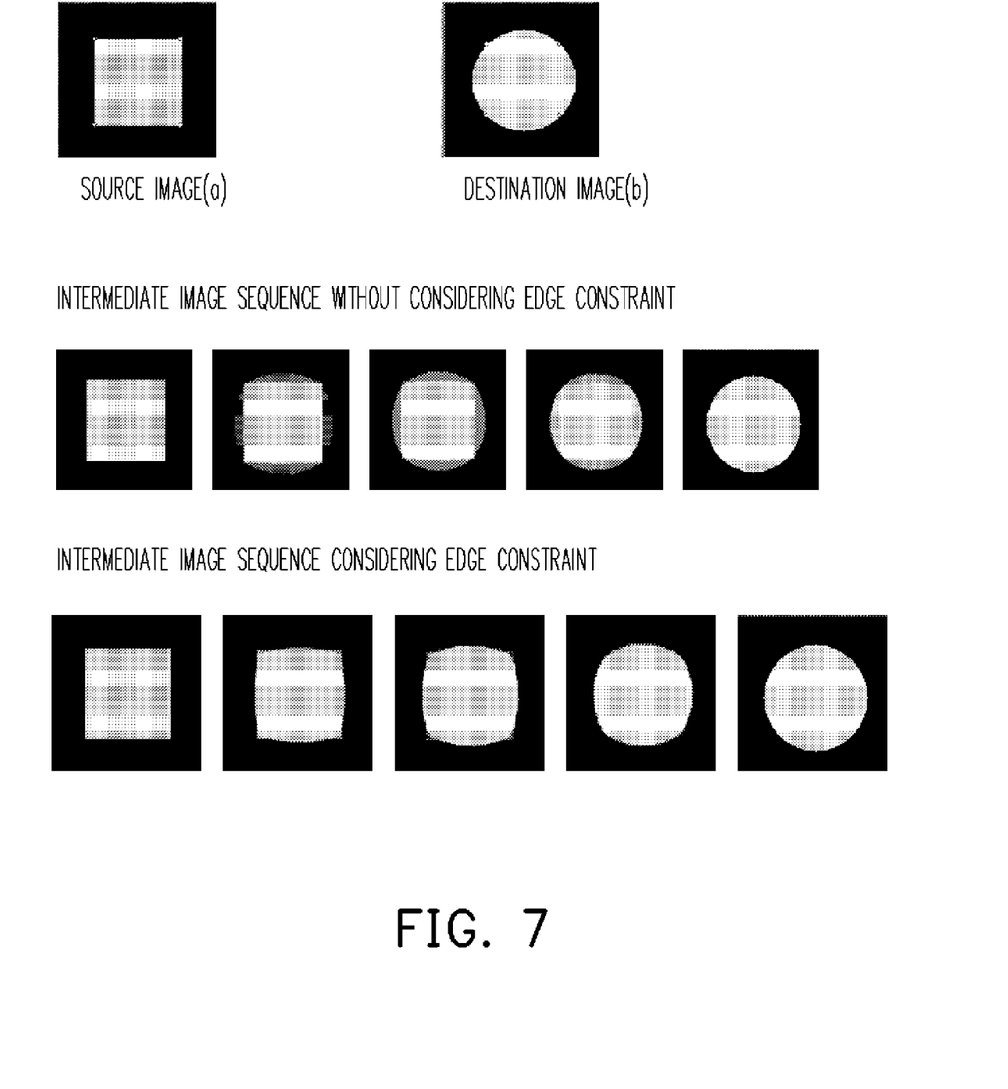
FIG. 7 includes diagrams respectively showing an intermediate image sequence considering edge constraint and an intermediate image sequence without considering edge constraint according to an embodiment of the present invention.

Thus it can be seen from FIG. 7, the morphing performance of an intermediate image sequence considering edge constraint is more superior than that without considering edge constraint. The image morphing method considering edge constraint even allows to omit a step of specifying and marking control points, because the locations where the greatest change of edge gradient for an image occurs are almost the most preferred locations for manually specifying and marking control points.

Figure 8:
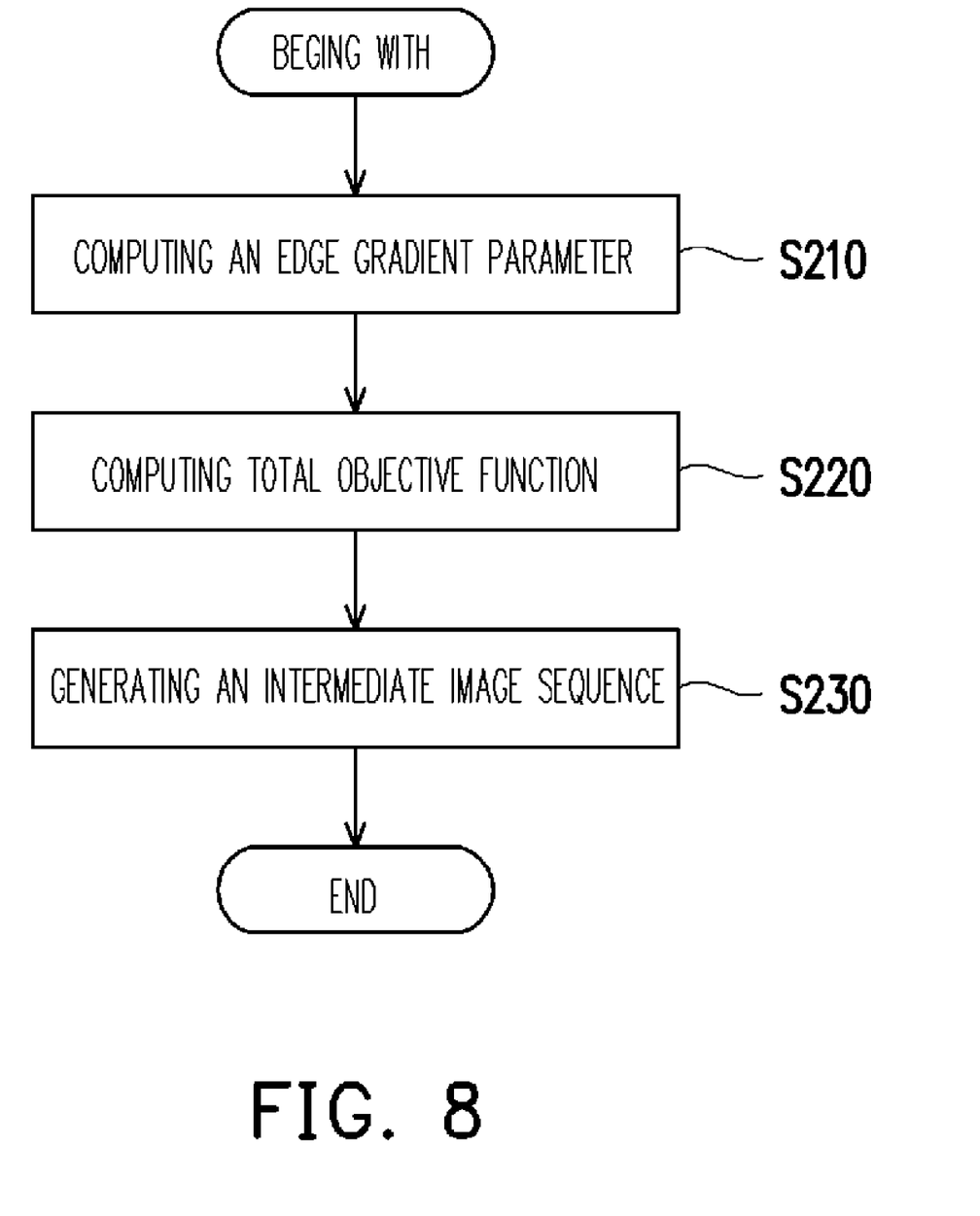
FIG. 8 is a flowchart showing the steps of image morphing method according to another embodiment of the present invention.
Figure 9:
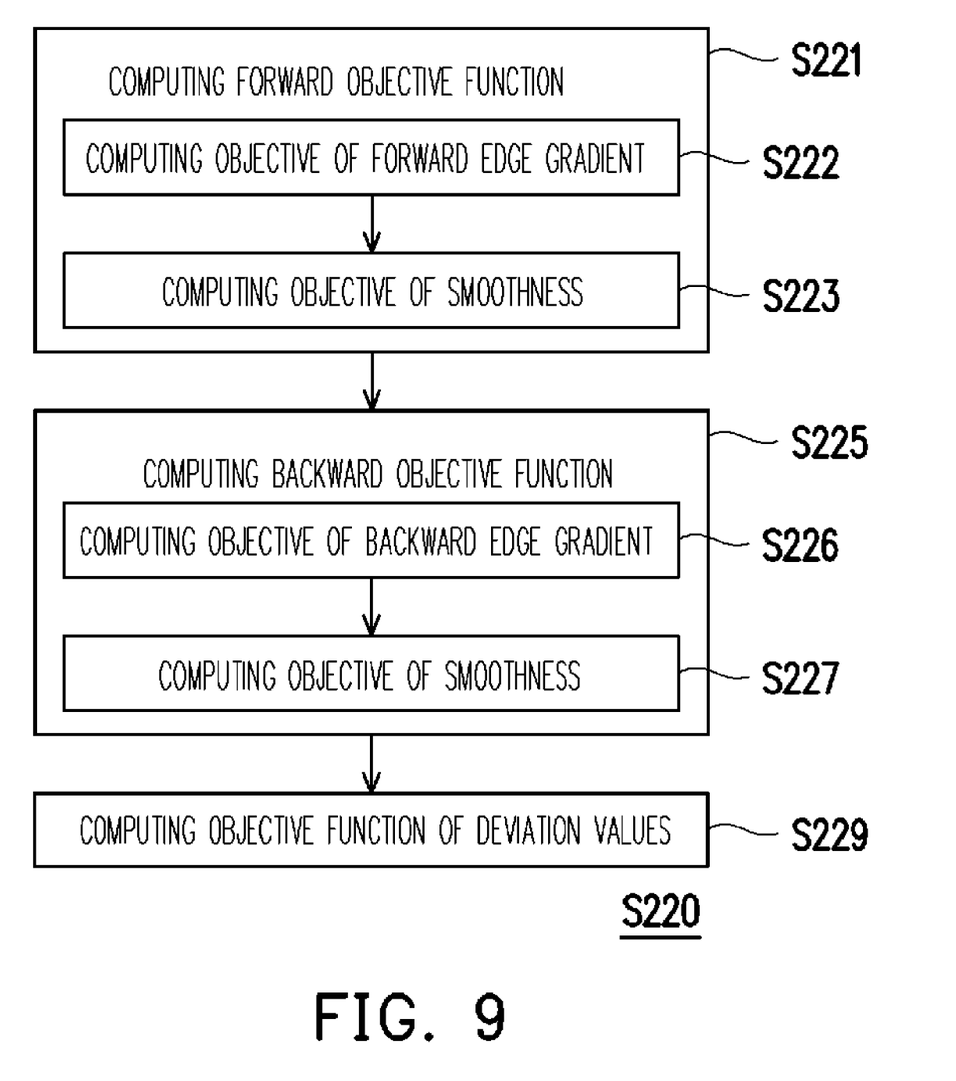
FIG. 9 is a flowchart showing the step of computing a total objective function according to another embodiment of the present invention.

FIG. 8 is a flowchart showing the steps of image morphing method without manually specifying and marking control points according to another embodiment of the present invention. Referring to FIG. 8, the steps S210 and S230 of the present embodiment are respectively similar to the steps S120 and S140 of the above-mentioned embodiment. Referring to FIG. 9, the step of computing a total objective function $E(D^f, D^b)$ in an embodiment of the present invention is similar to the step S130 of the above-mentioned embodiment except for omitting the step of computing objective of control point $E_{cp}(D)$. The implementation detail of the step S220 of the embodiment can be referred to the above embodiment and detail description thereof is omitted for simplicity.

In the embodiment, there is no operation of manually specifying and marking control points; instead, the embodiment only uses the objective of forward edge gradient $E_{edge}^f$ and the objective of smoothness $E_s(D)$ to determine the forward objective function $E^f(D^f)$ and uses the objective of backward edge gradient $E_{edge}^b$ and the objective of smoothness $E_s(D)$ to determine the backward objective function $E^b(D^b)$. Moreover in another embodiment of the present invention, only the objective of forward edge gradient $E_{edge}^f$ is used to determine the forward objective function $E^f(D^f)$ and the objective of backward edge gradient $E_{edge}^b$ used to determine the backward objective function $E^b(D^b)$. The unique point of the present embodiment rests in entirely dismissing the step of manually specifying and marking control points, which makes the method of generating an intermediate image sequence entirely automated.

In summary, the present invention has at least the following advantages:

1. By inducing the constraint of image edge gradient, the present invention largely lower the number of manually-marking control points of an operator, which lightens the operator burden.

2. For a same number of control points an operator specifies and marks, compared to the prior art, the quality of a generated intermediate image sequence cane be significantly promoted.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image morphing method, suitable for generating an intermediate image sequence, comprising:
   computing an edge gradient parameter $(I_{se}(\vec{x}), I_{de}(\vec{x}'))$ by a computer according to a source image $I_s(\vec{x})$ and a destination image $I_d(\vec{x}')$;
   computing a total objective function $E(D^f, D^b)$ by a computer according to the edge gradient parameter $(I_{se}(\vec{x}), I_{de}(\vec{x}'))$, wherein the total objective function $E(D^f, D^b)$ comprises:
   a forward objective function $E^f(D^f)$, wherein the forward objective function $E^f(D^f)$ is the objective of a forward morphing function $D^f((\vec{x})$;
   a backward objective function $E^b(D^b)$, wherein the backward objective function $E^b(D^b)$ is the objective of a backward morphing function $D^b(\vec{x}')$; and
   an objective function of deviation values $Dis(D^b, D^f)$, wherein the objective function of deviation values $Dis(D^b, D^f)$ is a distance between the forward morphing function $D^f(\vec{x})$ and the backward morphing function $D^b(\vec{x}')$; and
   generating the intermediate image sequence by the computer according to the total objective function $E(D^f, D^b)$.

2. The image morphing method according to claim 1, wherein the edge gradient parameter $(I_{se}(\vec{x}), I_{de}(\vec{x}'))$ comprises a source image edge gradient $I_{se}(\vec{x})$ and a destination image edge gradient $I_{de}(\vec{x}')$, and the step of computing the edge gradient parameter $(I_{se}(\vec{x}), I_{de}(\vec{x}'))$ comprises:
   computing the source image edge gradient $I_{se}(\vec{x})$ by the computer according to the source image $I_s(\vec{x})$, wherein $I_{se}(\vec{x}) = \nabla_{\vec{x}}(I_s(\vec{x}))$; and
   computing the destination image edge gradient $I_{de}(\vec{x}')$ by the computer according to the destination image $I_d(\vec{x}')$, wherein $I_{de}(\vec{x}') = \nabla_{\vec{x}'}(I_d(\vec{x}'))$.

3. The image morphing method according to claim 1, wherein the objective function of deviation values is defined by $$Dis(D^b, D^f) = \sum_{\vec{x}'} \rho_{dis}(d^b(\vec{x}') - d^f(\vec{x}' + d^b(\vec{x}'))) + \sum_{\vec{x}} \rho_{dis}(d^f(\vec{x}) - d^b(\vec{x} + d^f(\vec{x})))$$

and $\rho_{dis}(\vec{x}_1, \vec{x}_2) = \min(\lambda_{dis} \|\vec{x}_1 - \vec{x}_2\|, T_{dis})$.

4. The image morphing method according to claim 1, wherein the forward objective function $E^f(D^f)$ comprises:

an objective of forward edge gradient $E_{edge}{}^f$, wherein a parameter of the objective of forward edge gradient $E_{edge}{}^f$ comprises the edge gradient parameter ($I_{se}(\vec{x})$, $I_{de}(\vec{x}')$).

5. The image morphing method according to claim 4, wherein computing the objective of forward edge gradient $E_{edge}{}^f$ comprises $$E_{edge}^f(D^f) = \sum_{\vec{x}} \rho_{edge}\left(I_{se}(\vec{x}) - I_{de}\left(\vec{x} + \vec{d}^f(\vec{x})\right)\right),$$

wherein $\rho_{edge}(s) = \min(\lambda_{edge}|s|, T_{edge})$.

6. The image morphing method according to claim 4, further comprising:
specifying and marking at least a control point $CP = \{(p_i, q_i)\}_{i=1\ldots N}$ in a source image $I_s(\vec{x})$ and a destination image $I_d(\vec{x}')$ by the computer; wherein the forward objective function $E^f(D^f)$ comprises an objective of control point $E_{cp}(D)$, wherein a parameter of the objective of control point $E_{cp}(D)$ comprises the control point CP.

7. The image morphing method according to claim 6, wherein the step of computing the objective of control point $E_{cp}(D)$ comprises:
defining $$\vec{t}(\vec{x}) = \begin{cases} (\vec{q}_k - \vec{p}_k) & \text{if } \vec{x} = \vec{p}_k \\ \sum_{i=1}^{N} w_i(\vec{x})(\vec{q}_i - \vec{p}_i) & \text{else} \end{cases}$$

$$w_i(\vec{x}) = 1/\|\vec{x} - \vec{p}_i\| \sum_{i=1}^{N} \frac{1}{\|\vec{x} - \vec{p}_i\|}$$

wherein $\vec{t}(\vec{x})$ represents the displacement vector of each point in the source image $I_s(\vec{x})$ when taking account of the control point CP only; $w_i(\vec{x})$ represents an influence factor of the control point CP on regular image points; an objective of control point $E_{cp}(D)$ is defined by $$E_{cp}(D) = \sum_{\vec{x}} \rho_{cp}(\vec{d}(\vec{x}), \vec{t}(\vec{x})),$$

wherein $\rho_{cp}(\vec{a}, \vec{b}) = \min(\lambda_{cp}\|\vec{a} - \vec{b}\|, T_{cp})$ and $_{cp}$ is an amplitude-limited distance function; and
computing an objective of forward edge gradient $E_{edge}{}^f$ comprising $$E_{edge}^f(D^f) = \sum_{\vec{x}} \rho_{edge}\left(I_{se}(\vec{x}) - I_{de}\left(\vec{x} + \vec{d}^f(\vec{x})\right)\right),$$

wherein $\rho_{edge}(s) = \min(\lambda_{edge}|s|, T_{edge})$.

8. The image morphing method according to claim 1, wherein the forward objective function $E^f(D^f)$ comprises an objective of smoothness $E_s(D)$.

9. The image morphing method according to claim 8, wherein the step of computing the objective of smoothness $E_s(D)$ comprises:

assuming s is any one point in the image and N(s) is an m×m neighbouring domain of s, and defining $C = \{s, t \mid s < t, t \in N(s)\}$ to represent the pair number of adjacent points to s in the neighbouring domain, the objective of smoothness $E_s(D)$ is defined by $$E_s(D) = \sum_{s,t \in C} \lambda_s \|(s + d(s)) - (t + d(t))\|,$$

wherein $_s$ is a weight of the objective of smoothness $E_s(D)$ in the forward objective function $E^f(D^f)$, and m is a positive integer greater than or equal to 3.

10. The image morphing method according to claim 1, wherein the backward objective function $E^b(D^b)$ comprises:
an objective of backward edge gradient $E_{edge}{}^b$, wherein the parameter of the objective of backward edge gradient $E_{edge}{}^b$ comprises the edge gradient parameter ($I_{se}(\vec{x})$, $I_{de}(\vec{x}')$).

11. The image morphing method according to claim 10, wherein the step of computing the objective of backward edge gradient $E_{edge}{}^b$ comprises:

$$E_{edge}^b(D^b) = \sum_{\vec{x}} \rho_{edge}\left(I_{de}(\vec{x}) - I_{se}\left(\vec{x} + \vec{d}^b(\vec{x})\right)\right),$$

wherein $\rho_{edge}(s) \min(\lambda_{edge}|s|, T_{edge})$.

12. The image morphing method according to claim 10, further comprising:
specifying and marking at least a control point $CP = \{(p_i, q_i)\}_{i=1\ldots N}$ in a source image $I_s(\vec{x})$ and a destination image $I_d(\vec{x}')$ by the computer; wherein the backward objective function $E^b(D^b)$ comprises an objective of control point $E_{cp}(D)$, wherein the parameter of the objective of control point $E_{cp}(D)$ comprises the control point CP and an objective of backward edge gradient $E_{edge}{}^b$, wherein a parameter of the objective of backward edge gradient $E_{edge}{}^b$ comprises the edge gradient parameter ($I_{se}(\vec{x})$, $I_{de}(\vec{x}')$).

13. The image morphing method according to claim 12, wherein computing the objective of control point $E_{cp}(D)$ comprises:
defining $$\vec{t}(\vec{x}) = \begin{cases} (\vec{q}_k - \vec{p}_k) & \text{if } \vec{x} = \vec{p}_k \\ \sum_{i=1}^{N} w_i(\vec{x})(\vec{q}_i - \vec{p}_i) & \text{else} \end{cases}$$

$$w_i(\vec{x}) = 1/\|\vec{x} - \vec{p}_i\| \sum_{i=1}^{N} \frac{1}{\|\vec{x} - \vec{p}_i\|}$$

wherein $\vec{t}(\vec{x})$ represents the displacement vector of each point in the destination image when taking account of the control point CP only; $w_i(\vec{x})$ represents an influence factor of the control point CP on regular image points; the objective of control point $E_{cp}(D)$ is defined by $$E_{cp}(D) = \sum_{\vec{x}} \rho_{cp}(\vec{d}(\vec{x}), \vec{i}(\vec{x})),$$

wherein $\rho_{cp}(\vec{a}, \vec{b}) = \min(\lambda_{cp}\|\vec{a}-\vec{b}\|, T_{cp})$ is an amplitude-limited distance function; and computing the objective of backward edge gradient $E_{edge}^b$ comprising $$E_{edge}^b(D^b) = \sum_{\vec{x}} \rho_{edge}(I_{de}(\vec{x}) - I_{se}(\vec{x} + \vec{d}^b(\vec{x}))),$$

wherein $\rho_{edge}(s) = \min(\lambda_{edge}|s|, T_{edge})$.

14. The image morphing method according to claim 1, wherein the backward objective function $E^b(D^b)$ comprises an objective of smoothness $E_s(D)$.

15. The image morphing method according to claim 14, wherein the step of computing the objective of smoothness $E_s(D)$ comprises:

assuming s is any one point in the image and N(s) is an m×m neighbouring domain of s, and defining C={s, t|s<t,t∈N(s)} to represent a pair number of adjacent points to s in a neighbouring domain, then the objective of smoothness $E_s(D)$ is defined by $$E_s(D) = \sum_{s,t \in C} \lambda_s \|(s + d(s)) - (t + d(t))\|,$$

wherein $_s$ is the weigh of the objective of smoothness $E_s(D)$ in the backward objective function $E^b(D^b)$, and m is a positive integer greater than or equal to 3.

16. The image morphing method according to claim 1, further comprising:

specifying and marking at least a control point CP= $\{(p_i, q_i)\}_{i=1...N}$ in a source image $I_s(\vec{x})$ and a destination image $I_d(\vec{x}')$ by the computer.

17. The image morphing method according to claim 1, wherein generating the intermediate image sequence comprises:

computing the minimal value of the total objective function $E(D^f, D^b)$ to obtain a specific forward morphing function $\hat{D}^f$ and a specific backward morphing function $\hat{D}^b$ by the computer;

computing a forward transition image sequence $I_{si}(\vec{x})$ and a backward transition image sequence $I_{di}(\vec{x}')$ by using the specific forward morphing function $\hat{D}^f$ and the specific backward morphing function $\hat{D}^b$ by the computer; and conducting a color-blending operation on the forward transition image sequence $I_{si}(\vec{x})$ and the backward transition image sequence $I_{di}(\vec{x}')$ to generate the intermediate image sequence by the computer.

18. The image morphing method according to claim 17, wherein the method of computing the forward transition image sequence $I_{si}(\vec{x})$ and the backward transition image sequence $I_{di}(\vec{x}')$ comprises:

conducting an interpolation operation on the source image $I_s(\vec{x})$ by using the specific forward morphing function $\hat{D}^f$ to obtain the forward transition image sequence $I_{si}(\vec{x})$ by the computer; and conducting an interpolation operation on the destination image $I_d(\vec{x}')$ by using the specific backward morphing function $\hat{D}^b$ to obtain the backward transition image sequence $I_{di}(\vec{x}')$ by the computer.

\* \* \* \* \*